(12) United States Patent
Tofte et al.

(10) Patent No.: US 10,217,168 B2
(45) Date of Patent: Feb. 26, 2019

(54) MOBILE COMPUTING DEVICE FOR REAL-TIME ACCIDENT DOCUMENTATION AND CLAIM SUBMISSION

(71) Applicant: State Farm Mutual Automobile Insurance Company, Bloomington, IL (US)

(72) Inventors: Nathan Lee Tofte, Downs, IL (US); Kristina Renee Gish, Bloomington, IL (US); Jennifer Chizmar, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/778,977

(22) Filed: Feb. 27, 2013

(65) Prior Publication Data
US 2013/0317864 A1  Nov. 28, 2013

Related U.S. Application Data

(62) Division of application No. 13/480,225, filed on May 24, 2012.

(51) Int. Cl.
*G06Q 40/08* (2012.01)
*G06Q 10/06* (2012.01)

(52) U.S. Cl.
CPC ............. *G06Q 40/08* (2013.01); *G06Q 10/06* (2013.01)

(58) Field of Classification Search
CPC ........ G06Q 40/00; G06Q 40/08; G07C 5/008; G07C 5/085; G07C 5/0866; G07C 5/0891
USPC ............................ 705/4; 701/32.3, 33.2, 33.3
See application file for complete search history.

(56) References Cited

U.S. PATENT DOCUMENTS

| 5,950,169 | A  | * | 9/1999  | Borghesi et al. ................. 705/4 |
| 6,246,933 | B1 |   | 6/2001  | Bague .......................... 701/32.2 |
| 6,285,320 | B1 | * | 9/2001  | Olster et al. ................... 342/464 |
| 6,397,334 | B1 | * | 5/2002  | Chainer ................. G01S 17/88 380/200 |
| 6,470,303 | B2 | * | 10/2002 | Kidd et al. ......................... 703/8 |
| 6,850,843 | B2 |   | 2/2005  | Smith et al. ................. 701/32.2 |

(Continued)

OTHER PUBLICATIONS

European Search Report, Application No. 13169018, 6 pages, dated Aug. 13, 2013.

(Continued)

*Primary Examiner* — Sarah C Hamilton
(74) *Attorney, Agent, or Firm* — Slayden Grubert Beard PLLC

(57) ABSTRACT

A mobile computing device that facilitates efficient and convenient processing of an insurance claim. The mobile computing device can receive text, image, and audio data associated with the insurance claim. Using the received data, a model of the user's vehicle and the scene of the accident are generated and displayed on the mobile computing device. Damaged portions of the user's vehicle can be identified automatically or by the user. Damage can be tagged using the mobile computing device and additional data can be provided by the user and associated with each tag. The mobile computing device can be used to provide a preliminary claim assessment, submit a completed insurance claim application to an insurance provider, and/or process the insurance claim.

14 Claims, 7 Drawing Sheets

(56) References Cited

U.S. PATENT DOCUMENTS

| | | | |
|---|---|---|---|
| 6,912,293 B1* | 6/2005 | Korobkin | 382/100 |
| 7,082,356 B2* | 7/2006 | Mori | 701/1 |
| 7,236,596 B2 | 6/2007 | Prokoski | 380/258 |
| 7,466,244 B2 | 12/2008 | Kimchi et al. | 340/995.1 |
| 7,564,377 B2 | 7/2009 | Kimchi et al. | 340/995.13 |
| 7,596,242 B2* | 9/2009 | Breed et al. | 382/103 |
| 7,680,680 B2* | 3/2010 | Wahlbin et al. | 705/4 |
| 7,777,648 B2 | 8/2010 | Smith et al. | 340/995.1 |
| 8,035,639 B2* | 10/2011 | Witte | 345/419 |
| 8,103,445 B2 | 1/2012 | Smith et al. | 701/425 |
| 8,213,749 B2 | 7/2012 | Di Bernardo et al. | 382/305 |
| 8,239,220 B2* | 8/2012 | Kidd et al. | 705/4 |
| 8,260,489 B2* | 9/2012 | Nielsen et al. | 701/32.2 |
| 8,510,196 B1* | 8/2013 | Brandmaier | G06Q 40/08 705/35 |
| 2002/0013685 A1* | 1/2002 | Kidd et al. | 703/8 |
| 2003/0046003 A1* | 3/2003 | Smith et al. | 701/213 |
| 2003/0200123 A1* | 10/2003 | Burge et al. | 705/4 |
| 2003/0212567 A1* | 11/2003 | Shintani et al. | 705/1 |
| 2004/0117081 A1* | 6/2004 | Mori | 701/29 |
| 2005/0131657 A1 | 6/2005 | Mei | 703/1 |
| 2005/0131658 A1 | 6/2005 | Mei | 703/1 |
| 2005/0131659 A1 | 6/2005 | Mei | 703/1 |
| 2005/0251427 A1* | 11/2005 | Dorai et al. | 705/4 |
| 2005/0278371 A1 | 12/2005 | Funk et al. | |
| 2006/0106652 A1 | 5/2006 | Wamsley | 705/4 |
| 2006/0268153 A1* | 11/2006 | Rice et al. | 348/370 |
| 2007/0049250 A1 | 3/2007 | Chambers | 455/411 |
| 2007/0070233 A1 | 3/2007 | Patterson | 348/333.12 |
| 2007/0132567 A1 | 6/2007 | Schofield et al. | 340/438 |
| 2007/0136106 A1* | 6/2007 | Hart et al. | 705/4 |
| 2007/0165021 A1* | 7/2007 | Hanke | 345/419 |
| 2007/0210937 A1 | 9/2007 | Smith et al. | 340/995.1 |
| 2007/0288135 A1* | 12/2007 | Kidd et al. | 701/29 |
| 2008/0186724 A1 | 8/2008 | Lynam et al. | 362/494 |
| 2008/0255887 A1* | 10/2008 | Gruter | 705/4 |
| 2008/0267487 A1* | 10/2008 | Siri | 382/141 |
| 2008/0310756 A1* | 12/2008 | Tao et al. | 382/285 |
| 2009/0002364 A1* | 1/2009 | Witte, II | 345/419 |
| 2009/0132436 A1* | 5/2009 | Pershing et al. | 705/400 |
| 2009/0138290 A1* | 5/2009 | Holden | 705/4 |
| 2009/0265193 A1* | 10/2009 | Collins et al. | 705/4 |
| 2010/0014842 A1 | 1/2010 | Eder et al. | 386/200 |
| 2010/0045790 A1 | 2/2010 | Lynam et al. | 348/140 |
| 2010/0141779 A1 | 6/2010 | Rhoads | 348/207.1 |
| 2010/0256863 A1 | 10/2010 | Nielsen et al. | 701/31.4 |
| 2010/0256981 A1* | 10/2010 | Nielsen et al. | 705/1.1 |
| 2010/0257477 A1* | 10/2010 | Nielsen et al. | 715/771 |
| 2011/0087505 A1* | 4/2011 | Terlep | 705/4 |
| 2011/0218825 A1* | 9/2011 | Hertenstein | 705/4 |
| 2011/0282542 A9 | 11/2011 | Nielsen et al. | 701/31.4 |
| 2011/0295446 A1* | 12/2011 | Basir et al. | 701/1 |
| 2012/0037700 A1* | 2/2012 | Walji et al. | 235/385 |
| 2012/0059676 A1* | 3/2012 | King | 705/4 |
| 2012/0076437 A1* | 3/2012 | King | 382/286 |
| 2012/0086808 A1 | 4/2012 | Lynam et al. | 348/148 |
| 2012/0116819 A1* | 5/2012 | Hertenstein | 705/4 |
| 2012/0140080 A1 | 6/2012 | Taylor et al. | 348/148 |
| 2012/0143630 A1* | 6/2012 | Hertenstein | 705/4 |
| 2012/0179431 A1* | 7/2012 | Labrie et al. | 703/1 |
| 2012/0296561 A1* | 11/2012 | Park et al. | 701/119 |
| 2012/0297337 A1* | 11/2012 | St. Denis et al. | 715/810 |
| 2013/0079236 A1* | 3/2013 | Holmes | 506/9 |
| 2013/0083196 A1* | 4/2013 | Zheng | 348/148 |
| 2013/0204645 A1* | 8/2013 | Lehman | G06Q 40/08 705/4 |

OTHER PUBLICATIONS

Bantz, D. et al., "BlueStar: Wireless Claims Processing for the Property and Casualty Industry," ICEBE 2008 Paper Submission V. 2.6, 12 pages, Apr. 16, 2011.

"AAA Insurance App Now Available for Android Device," US Newswire, Proquest, 2 pages, Nov. 30, 2011.

U.S. Advisory Action, U.S. Appl. No. 13/480,225, 5 pages, dated Aug. 11, 2015.

U.S. Final Office Action, U.S. Appl. No. 13/778,717, 17 pages, dated Aug. 19, 2015.

U.S. Final Office Action, U.S. Appl. No. 13/779,123, 38 pages, dated Aug. 19, 2015.

U.S. Non-Final Office Action, U.S. Appl. No. 13/480,225, 36 pages, dated Feb. 10, 2016.

U.S. Non-Final Office Action, U.S. Appl. No. 13/779,123, 43 pages, dated Feb. 12, 2016.

U.S. Non-Final Office Action, U.S. Appl. No. 13/778,717, 19 pages, dated Oct. 11, 2016.

U.S. Final Office Action, U.S. Appl. No. 13/779,123, 50 pages, dated Jul. 21, 2016.

U.S. Non-Final Office Action, U.S. Appl. No. 138/480,225, 44 pages, dated Feb. 14, 2017.

U.S. Final Office Action, U.S. Appl. No. 13/480,225, 41 pages, dated Aug. 1, 2017.

U.S. Non-Final Office Action, U.S. Appl. No. 13/480,225, 28 pages, dated Jun. 4, 2018.

* cited by examiner

MOBILE COMPUTING DEVICE FOR REAL-TIME ACCIDENT DOCUMENTATION AND CLAIM SUBMISSION

CROSS-REFERENCE TO RELATED APPLICATIONS

This application is a Divisional of U.S. patent application Ser. No. 13/480,225 filed May 24, 2012. The contents of which is incorporated herein by reference in its entirety.

TECHNICAL FIELD

The present disclosure relates generally to insurance claim processing, and more particularly to an insurance processing system generating a three dimensional model of the damaged object and scene of the insurance claim.

BACKGROUND

Insurance claim processing can include redundancy and delay while various parties (policyholder, insurer, repair facility, etc.) collect claim information. When the policyholder submits their claim, inevitably additional information is required by the insurance provider to process the claim and the policyholder must typically wait on approval from either, or both, of the insurer or the repair facility before the claim can be processed and the damage repaired. For example, while the vast majority of automobile accident claims involve only minor damage, physical inspection(s) and the presence of an insurer agent (e.g., claim estimator) are generally required to assess the damage in detail.

Typical claim processing requires the policyholder initiate the insurance claim and make an initial trip to a repair facility for a preliminary damage assessment. Additional trip(s) to the repair facility will likely be required to complete vehicle repairs. Often, the policyholder must wait for their claim to be processed while a claim estimator inspects the damage to the vehicle and approves the repair.

One conventional approach to expediting insurance claim submission is to provide a policyholder access to initiate/submit their insurance claim via telephone. While telephone submission does not require the policyholder physically submit their claim, the policyholder is still required to submit information and/or coordinate information exchange with the insurer and the repair facility. Often, similar information is submitted in alternate forms to satisfy insurer requirements. Because the policyholder is required to be on the telephone with the insurer to document the claim, the policyholder has reduced flexibility with respect to the type and order of providing the claim information. Likewise, telephone submission does not resolve the delay problems associated with the repair facility assessment and claim estimator inspection.

Some insurers provide for online/electronic initiation and submission of insurance claims. Online claim submission does not resolve the burden on the policyholder of having to submit redundant information or coordinating information exchange between the insurer and the repair facility. Also, with online claim submissions there is an increase likelihood of fraudulent claims. Because there is often some delay between the claim event (e.g., car accident) and the time the policyholder files the claim, the insurer is unable to confirm that damage to the policyholder's property is a result of the accident, as claimed, or whether the damage occurred later and is unrelated to the accident. Similarly, online claim submissions do not resolve the delay associated with the repair facility assessment and claim estimator inspection.

Conventional methods for processing an insurance claim are not efficient, convenient, and effective in collecting all information necessary to accurately and quickly processing an insurance claim. Therefore, a need in the art exists for systems and methods that overcome one or more of the above-described limitations.

SUMMARY

The present invention is directed to a method for processing an insurance claim. An aspect of the present invention provides a computer-implemented method for processing an insurance claim by initiating the insurance claim; receiving user data associated with the insurance claim, the user data including an image; generating a model of a scene associated with the insurance claim using the user data, the scene including a model of an object; analyzing the user data to identify a damaged portion of the object; analyzing the damaged portion to determine a claim element; and analyzing at least one of the user data, the model of the scene, and the claim element to determine whether the insurance claim satisfies a processing criteria.

Another aspect of the present invention provides a computer program product for processing an insurance claim. The computer program product may comprise a computer-readable storage device having computer-readable program instructions stored therein. The computer-readable program instructions may include instructions for processing an insurance claim by initiating an insurance claim application; receiving user data (including an image) associated with the insurance claim; generating a model of a scene of the insurance claim using the user data, the scene including a model of the user's vehicle; analyzing the user data to indicate a portion of the model corresponding to damage on the user's vehicle; analyzing the portion of the model to determine a claim element; analyzing at least one of the user data, the model, and the claim element to determine whether the insurance claim application satisfies a processing criteria.

Another aspect of the present invention provides a mobile computing device. The mobile computing device can include a processor, a computer-readable media, a memory storage device, and an insurance claim processing application. The insurance claim processing application can be stored on the memory storage device for execution via the computer-readable media. The insurance claim processing application can be configured to: receive user data associated with an insurance claim, the user data including an image of an object; transmit the user data to a remote server; receive a model of a scene of the insurance claim from the remote server, the scene including a model of the object; display the model; receive a user input indicating a portion of the model corresponding to a damaged portion of the object; provide an indication corresponding to the damaged portion of the object; receive additional user data associated with the damaged portion of the object; and transmit the indication and the additional user data to the remote server.

Another aspect of the present invention provides an insurance claim processing server. The insurance claim processing server can include a processor, a computer-readable media, a memory storage device for storing and providing access to data that is related to an insurance claim, and an insurance claim processing application. The insurance claim processing application can be stored on the memory storage device for execution by the computer-readable media. The insurance claim processing application can be configured to: initiate the insurance claim; receive user data associated with the insurance claim, the user data including an image of an object; analyze the user data to generate a model of a scene associated with the insurance claim, the scene including a model of an object; analyze the model of the scene to identify a damaged portion of the object; transmit the model of the scene to a user device; analyze the damaged portion to determine a claim element; analyze at least one of the user data, the model of the scene, and the claim element to determine whether the insurance claim satisfies a processing criteria; and process the insurance claim when the processing criteria is satisfied.

DETAILED DESCRIPTION

The present disclosure provides an insurance claim processing system and method that facilitates fast and convenient claim processing using a mobile electronic device to collect the information necessary for an insurance provider to process the claim. For example, using a claim processing application resident on a policyholder's mobile device, the policyholder is able to collect the necessary information for processing their insurance claim. The information collected by the policyholder can take the form of text, video, and audio data. In addition to processing the policyholder's claim, the disclosed claim processing system can be used to provide a preliminary claim assessment and schedule necessary repairs. The disclosed system improves communication throughout the insurance claim process and reduces claim processing time for both the policyholder and the insurance provider. The disclosed system permits the insurer to begin processing a policyholder's claim immediately. It also permits an associated repair facility to prepare to receive the damaged object, rather than wait for the policyholder to provide additional details and/or a complete insurance claim.

The overall system architecture as well as the use of a mobile computing device in conjunction with an insurer server are described. It is contemplated that the described system may be used to process insurance claims on various objects. As used throughout the specification, "objects" should be interpreted to include any tangible object insured by a user/policyholder. In an exemplary embodiment, such "objects" can include any type of vehicle, such as, automobiles, boats, recreational vehicles, motorcycles, and bicycles, as well as other forms of personal property including the user's home, jewelry, firearms, etc. The exemplary embodiments analyze information provided regarding the object, generate a model of the object, and identify damaged portions of the object. Using the information regarding the damaged object, disclosed the insurance claim processing system may be used to determine various elements of the insurance claim (e.g., identify damaged components, estimate repair costs, identify potential occupant injury, etc.) and provide an initial claim assessment, submit a completed insurance claim application to an insurance provider, and/or process the insurance claim. Exemplary embodiments may query the user when the information necessary for processing the insurance claim is insufficient or when further information is required to estimate the damage to the object. As a result, through this iterative process of requesting information, the user is able to provide more complete claim data and their claim may be processed more efficiently.

Figure 1:
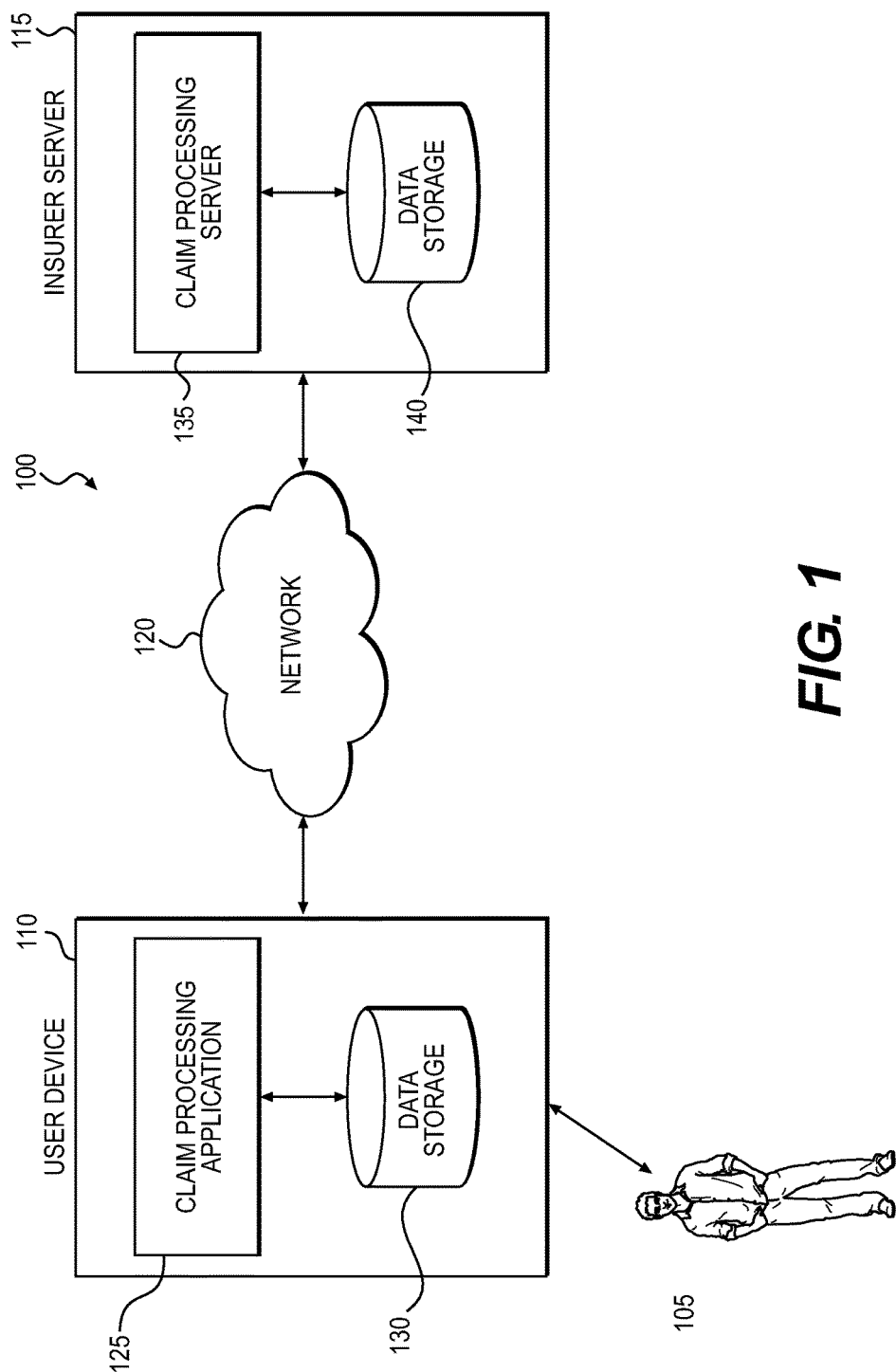
FIG. 1 is a block diagram depicting an operating environment of an insurance claim processing system in accordance with certain exemplary embodiments.

FIG. 1 illustrates the main components of operating environment 100 for an insurance claim processing system in accordance with certain exemplary embodiments. The insurance claim processing system can be embodied as a stand alone application program or as a companion program to a web browser having messaging and storage capabilities. While certain embodiments are described in which parts of the claim processing system are implemented in software, it will be appreciated that one or more acts or functions of the claim processing system may be performed by hardware, software, or a combination thereof, as may be embodied in one or more computing systems.

The exemplary operating environment 100 includes a user device 110 associated with a user 105, and insurer server 115, and a network 120. The user device 110 may be a personal computer or a mobile device, (for example, notebook computer, tablet computer, netbook computer, personal digital assistant (PDA), video game device, GPS locator device, cellular telephone, smartphone, camera, or other mobile device), or other appropriate technology. The user device 110 may include or be coupled to a web browser, such as MICROSOFT'S INTERNET EXPLORER® for accessing the network 120. The network 120 includes a wired or wireless telecommunication system or device by which network devices (including user device 110 and insurer server 115) can exchange data. For example, the network 120 can include a telecommunications network, a local area network (LAN), a wide area network (WAN), an intranet, an Internet, or any combination thereof. It will be appreciated that the network connections disclosed are exemplary and other means of establishing a communications link between the user device 110 and the insurer server 115 can be used.

The user device 110 includes a claim processing application 125 including various routines, sub-routines, programs, objects, components, data structures, etc., which perform particular tasks or implement particular abstract data types. The exemplary claim processing application 125 can facilitate collection of data from the user 105 necessary for processing an insurance claim. An insurance claim can be initiated at the user device 110 using the claim processing application 125. The exemplary claim processing application 125, using via the network 120, can send and receive data between the user device 110 and the insurer server 115. The exemplary claim processing application 125 can also interact with a web browser application resident on the user device 110 or can be embodied as a companion application of a web browser application. In a web browser companion application embodiment, the user interface of the claim processing application 125 can be provided via the web browser.

The claim processing application 125 can provide a user interface via the user device 110 for collecting and displaying data relevant to the insurance claim. Using the user device 110 and the claim processing application 125, the user 105 can input, capture, view, download, upload, edit, and otherwise access and manipulate user data regarding an insurance claim. Throughout the discussion of exemplary embodiments, it should be understood that the terms "data" and "information" are used interchangeably herein to refer to text, images, audio, video, or any other form of information that can exist in a computer-based environment. The user 105 can enter commands and information to the claim processing application 125 through input devices, such as a touch screen, keyboard, pointing device, and camera. The pointing device can include a mouse, a trackball, a stylus/electronic pen that can be used in conjunction with user device 110. Input devices can also include any other input device, such as a microphone, joystick, game pad, or the like. The camera can include a still camera or a video camera, a stereoscopic camera, a two-dimensional or three-dimensional camera, or any other form of camera device for capturing images of the object/scene of interest. In an exemplary embodiment, the camera is an integral component of the user device 110. In an alternate embodiment, the input device is coupled to the user device 110. In an exemplary embodiment, the user device 110 can include GPS or similar capabilities to provide user device 110 location information.

The user device 110 can include an integral display. The display can provide images and information associated with the claim processing application 125 to the user 105. In an exemplary embodiment, the user 105 can view and manipulate the images illustrated on the display. For example, the user 105 can pan, zoom, rotate, and highlight the image and/or portions of the image. In an alternate embodiment, the user device 110 can include a monitor connected to the user device 110. In addition to the display, the user device 110 can include other peripheral output devices, such as speakers and a printer.

Figure 2:
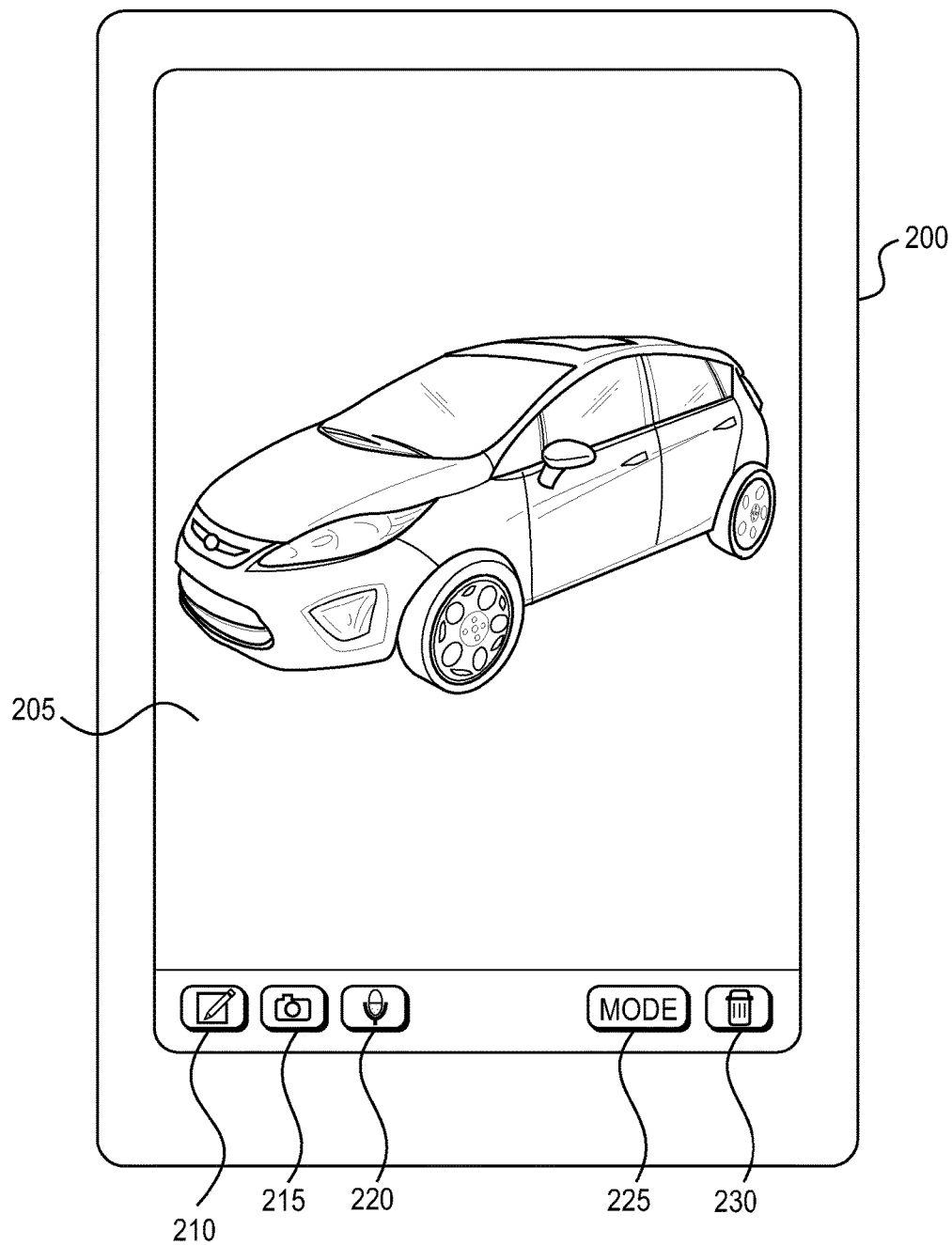
FIG. 2 is an illustration of an exemplary mobile computing device having the system, according to certain exemplary embodiments, installed and operating thereon.

As illustrated in the exemplary user device depicted in FIG. 2, a mobile phone 200 can include a touch screen display 205 that provides the user 105 access to various functions of the claim processing application 125 resident on the mobile phone 200. For example, the touch screen display 205 can include a text icon 210, a image icon 215, a audio icon 220, a mode icon 225, and a trash icon 230. Additional or fewer icons and related functions considered relevant in the art can be included. Using the appropriate icons, the user 105 can interact with the claim processing application 125 to provide text, image, and/or voice data to the insurer server 115 regarding the insurance claim.

The exemplary claim processing application 125 enables storage of user data associated with the insurance claim at a data storage unit 130 accessible by the claim processing application 125. The exemplary data storage unit 130 can include one or more tangible computer-readable storage devices resident on the user device 110 or logically coupled to the user device 110. For example, the data storage unit 130 can include on-board flash memory and/or one or more removable memory cards or removable flash memory.

The exemplary operating environment 100 also includes a insurer server 115. The insurer server can be operated by the insurance provider and can provide insurer-side claim processing and data storage. The insurer server 115 can include one or more computer systems. An exemplary computer system can include a claim processing server 135, a data storage unit 140, and a system bus that couples system components, including the data storage unit 140, to the claim processing server 135.

While the user 105 can interact with the claim processing application 125 via the user device 110 to add, modify, or remove user data, the user 105 can similarly interact with the insurer server 115. The claim processing server 135 also provides the insurance provider with the ability to add, modify, or remove data associated with the insurance claim. The claim processing server 135 also enables the insurance provider with the ability to communicate/query the user 105 via the claim processing application 125. In return, the claim processing application 125 allows the user 105 to input and respond to insurer queries provided via the insurer server 115.

The claim processing server 135 is capable of providing an initial claim assessment, submitting a completed insurance claim application to an insurance provider, and/or processing user data and completing an insurance claim. In an exemplary embodiment, the insurer server 115 and the claim processing server 135 can include various routines, sub-routines, programs, objects, components, data structures, etc., which perform particular tasks or implement particular abstract data types. The exemplary claim processing server 135 can facilitate the collection and processing of data from the user 105 necessary for completing an insurance claim. The claim processing server 135 can send and receive data between the user 105 and the insurer server 115 via the network 120 or a web browser. As provided above, user data can take the form of text, audio, and images. The insurer server 115 can provide an interface with the insurance provider and their affiliates, including, for example, a claim agent, a repair facility, and any other person required to access the user data and insurer created data regarding the insurance claim. The exemplary claim processing server 135 may query the user 105 to provide additional and/or supplemental information regarding the insurance claim. The request for additional information can be provided in response to an insurer query and/or a repair facility query. The exemplary claim processing server 135 can also request additional/supplemental information in response to identification deficiencies in the quantity or quality of data received, as determined by the claim processing server 135. For example, the claim processing server 135 can determine when there is sufficient information with respect to the insurance claim to process and finalize the claim.

The exemplary claim processing server 135 can generate a two-dimensional (2D) and/or three-dimensional (3D) model of the object associated with the insurance claim. In an exemplary embodiment, user data, such a photos or video images of the object, is used by the claim processing server 135 can create a dynamic 3D model and/or rendering of the object. To create the model, the claim processing server 135 can utilize various methods of imaging processing including, for example, edge detection, 3D scanning, stereoscopic imaging, or any other 3D modeling method known in the art. For example, the claim processing server 135 can create a 3D model/rendering of the object by combing or overlaying multiple still images and/or video images of the object taken from different positions. In the example of a car accident, the claim processing server 135 can generate a dynamic 3D model of the car using still or video images captured by the user 105. It is also contemplated that the claim processing server 135 can generate 3D models of another party's car, or any other object that is relevant to the insurance claim. In an exemplary embodiment, the claim processing server 135 may use stored data regarding the object to generate the 3D model. Stored data regarding the object can include, for example, reference 2D/3D model information for the same or similar object. In an exemplary embodiment where the user device 110 does not include a functioning camera or is otherwise incapable of capturing images of the object, the claim processing server 115 will recognize that no image data is available from the user 105 and provide a model of the object based on stored image data of the same or similar objects. In an embodiment involving a car accident, if there is no image data available the claim processing server 135 may use stored image data of a car having the same make/model as the user's 105 car to generate the model for display and use by the user 105. In an alternate embodiment, the claim processing server 135 may use stored data regarding the object to supplement the image data provided by the user 105. For example, if the user 105 provides incomplete or poor quality image data, the claim processing server 135 may supplement and/or replace the user-provided image data with stored image data of the same or similar object. In the embodiment involving a car accident, if the user image data is incomplete/inadequate, the claim processing server 135 may use stored image data of the same make/model of the user's car to supplement the user-captured images and generate the model.

An exemplary claim processing server 135 can generate a 2D and/or 3D model of the scene associated with the insurance claim. For example, using user data, such as photos or video images of the scene, the claim processing server 135 can create a dynamic 3D model and/or rendering of the scene and display the model to the user 105 via the user device 110. To create the scene model, the claim processing server 135 uses similar methods of image processing as those used to model the object. For example, in the case of a car accident, the claim processing server 135 can generate a dynamic 3D model of the scene of the accident using still or video images captured by the user 105. In an exemplary embodiment, the claim processing server 135 may use stored data regarding the scene to generate the model. Stored data regarding the scene can include, for example, a 2D/3D map of the scene, topographical information, municipality information (location of pedestrian cross-walks, posted speed limits, traffic signals, etc.), and any other information relevant to generating the model. In an alternate embodiment, the claim processing server 135 can use the stored scene data to supplement and/or replace the user-provided image data. For example, if the user 105 provides incomplete or poor quality image data, the claim processing server 135 may supplement and/or replace the user-provided image data with stored image data of the scene.

In an exemplary embodiment, the quality of the model can be related to the quality of images obtained by the user 105. Accordingly, the claim processing application 125 and/or the claim processing server 135 may include a pacing feature. The pacing feature can indicate to the user 105 the rate at which images should be captured. For example, when the user 105 is providing video image data, if the user pans/moves the camera too quickly across the field of view a blurred image may result. Accordingly, the claim processing application 125 and/or the claim processing server 135 may provide to the user 105, via the user device 110 interface, a pacing feature to indicate to the user 105 the rate at which the camera should be moved. An exemplary pacing feature can be in the form of a dynamic image on the display of user device 110. In an exemplary embodiment, the pacing feature may include an audio or text message to the user 105.

In an exemplary embodiment, the claim processing server 135 can interact with the user 105 to identify (i.e., tag) portions of the object model and scene model. The user 105 can interact with the model and tag portions of the model using the user interface provided on the user device 110. Once a portion of the model has been tagged, the user 105 can enter text, image, and/or audio data associated with that tag. For example, the user 105 can tag a portion of the model corresponding to the front windshield of the user's 105 car. Once the front windshield has been tagged, the user 105 can select between entering text, image, and/or audio data regarding the front windshield. For example, the user 105 could enter text and/or audio data indicating the front windshield is now cracked (e.g., "I have a crack across the front of my windshield"). Alternatively, user 105 can provide image data regarding the state of the windshield, e.g., the user 105 can take an image of their front windshield. It is contemplated that the user 105 can include multiple forms of data associated with each tag. The data entered by the user 105 is linked to the tag, uploaded to the claim processing server 135, and used by the claim processing server 135 in processing the claim. In an alternate embodiment, the insurance provider and/or repair facility can interact with the model using tags. For example, the insurance provider can tag portions of the model that require additional information and request that the user 105 provide the information in response. Similarly, the repair facility can access the insurance claim application 125 using a web browser and tag portions of the model. The repair facility can provide data (text, image, audio) associated with the tag. For example, the repair facility may identify damaged portions of the object, suggest possible hidden damage, provide price estimates for repairing damage, etc.

An exemplary claim processing server 135 can extract features from the image data so that damaged portions of the object can be identified. Analyzing the extracted features, the claim processing server 135 can determine associations between the features and the object in the image. The features may include, for example, color, texture (spatial frequency), brightness, contrast, edge detection, corner detection, text, coordinates relative to the coordinate system of the image, coordinates relative to a coordinates other than that of the image (e.g., global positioning coordinates), depth/surface mapping, metadata embedded into the image file, or any other feature relevant to modeling the imaged object. For example, in the case of an automobile accident, using extracted features such as color, texture data, and coordinate data, the claim processing server 135 can identify portions where the color, texture pattern, and/or coordinates are irregular or not in alignment with reference vehicle data, thereby identifying portions of the vehicle with potential damage. For example, using the extracted features the exemplary claim processing server 135 can identify, for example, damage to the driver-side front fender of the user's 105 car.

An exemplary claim processing server 135 can utilize the extracted feature data regarding damaged portions of the object to determine the identity of the damaged object components. For example, using the damage information, the claim processing server 135 can identify what components of the user's 105 vehicle may be damage. These components can be identified by name, part number, serial number, etc. These components can be highlighted or listed on the user device 110. Using this information, the claim processing server 135 can expedite processing the insurance claim and repair. For example, if damaged component identification information is provided to the repair facility in advance of the user 105 bring their vehicle in for report, the repair facility can ensure that the necessary parts are in stock and available. In an exemplary embodiment, the claim processing server 135 can use the extracted feature data identifying the damaged components of the object to calculate repair/replacement costs of the damaged components. For example, once the damaged components have been identified, the data storage unit and/or any database available via network 120 can be searched to identify replacement cost for the component as well as the anticipated repair facility charges with respect to the location of the claim.

In an exemplary embodiment, the claim processing server 135 can utilize the extracted feature data and the related damage information to identify and/or estimate hidden damage to the object. Using the damage information, the claim processing server 135 can identify components related to, or proximate, the damaged components as also containing potential damage. For example, if the damage information identifies that the front driver side fender of the user's 105 car is damaged, the claim processing server 135 can identify related components that may also be potentially damaged, including, for example, the headlamp, wheel, or front axle of the vehicle. Having identified potentially damaged components, the claim processing server 135 can determine if additional information is necessary from the user 105 regarding the potentially damaged components. For example, the claim processing server 135 may query the user 105 to provide images of the potentially damaged components, the user 105 may be asked to supply text or audio providing functional information with respect to the potentially damaged components, or the user 105 may be queried to provide any other information relevant to determining whether the potentially damaged component are indeed damaged and repair/replacement necessary. The claim processing server 135 may also query a repair facility to assist in identifying and confirming damage of, potentially damaged components based on the damage information and supplemental data provided by the user 105.

An exemplary claim processing server 135 can utilize the extracted feature data and the related damage information to determine the force of impact on the object. For example, using extracted features such as contrast, edge detection, corner detection, object component coordinates, and depth/surface mapping, the claim processing server 135 is able to determine the force necessary to cause the visible damage to the object. In an exemplary embodiment, the force of impact can be determined by comparing the dimensions (e.g., length, width, height) of the model generated by the claim processing server 135 with dimension information included in the stored data corresponding to the same (or similar) object. For example, knowing the make and model of the user's 105 vehicle, dimension information regarding the vehicle can be identified. This dimension information can be compared to the corresponding dimensions determined from the generated model. Locations where the dimensions of the user's 105 vehicle vary from the stored dimension information can be used to identify damage to the vehicle. By comparing the stored dimension information with the dimensions determined from the generated model, the displacement and/or deformation of the object can be determined. Using this displacement and/or deformation information, the magnitude and the direction of the force applied to the object can be calculated. In another exemplary embodiment, the force of impact can be determined using volume comparison. In general, because the generated model is damaged it will have less volume than the stored model. By comparing the volume of the model generated by the claim processing server 135 with the volume of the same (or similar) object, a difference in volume can be calculated. The volume difference can be used to determine the magnitude and the direction of the force applied to the object. In an alternative embodiment, the volume difference can be used to determine the displacement and/or deformation of the object. The displacement and/or deformation information can then be used to determine the direction and force of impact.

In another exemplary embodiment, the force of impact can be determined using finite element analysis. In the exemplary embodiment, the stored data regarding the object may include a model of the vehicle's structure. This model can include information regarding the material properties of the object and its various components as well as information on the structure/construction of the object. Using finite element analysis, the stored data can be compared with the model generated by the claim processing server 135. In an exemplary embodiment, the generated model is divided into a series of elements, the elements can include particular vehicle components, discrete portions of the model related to or independent of vehicle components, or any other form of segmenting the generated model useful in finite element analysis. The displacement of each element is determined. Using the displacement data and the stored data regarding material properties and vehicle structure, the value of the forces/stresses and strains applied to the object can be determined at each element. Using the stress, strain and displacement information, the magnitude and direction of the force of impact can be determined. The force of impact can be measured in newtons (N) or other quantitative measure such as estimated speed/acceleration at impact. Alternatively, force of impact can be measured in terms of quality (e.g., minor, moderate, severe). In an exemplary embodiment, the claim processing server 135 compares the extracted feature data to stored feature data. This comparison provides an indication of the force of impact on the object. By comparing the extracted feature data to the stored feature data, the claim processing server 135 can calculate coordinate changes of identified points, edges, corners, or surfaces of the object. These coordinate changes may be the result of compression/deformation of the object upon impact, e.g., crumple zones. Similarly, extracted feature data such as coordinate changes, contrast, and depth/surface mapping can be used to determine the surface and/or body deformation of the object.

In an exemplary embodiment, by calculating the force of impact on the object, the claim processing server 135 can determine the force of impact on the occupant(s) of the vehicle. Using the impact on the occupant(s), the claim processing server 135 can identify possible occupant injury. For example, if the claim processing server 135 determines that the force of impact is categorized as "minor," then the corresponding occupant injury may also be identified as "minor." In an exemplary embodiment, using force of impact on the occupant(s) and the location of impact (i.e., the identity of damaged components), the claim processing server 135 can estimate occupant injury. For example, if the claim processing server 135 determines that the force of impact was minor, the occupant injury was minor, and the damaged vehicle components include the front driver-side fender and driver-side door, the claim processing server 135 may identify whiplash and minor bruising as possible occupant injuries. In an exemplary embodiment, the claim processing server 135 can use the estimated occupant injury to validate future medical claims by the occupant(s). It is also contemplated that the claim processing server 135 can calculate the force of impact on the other party's object (car), as well as any corresponding impact on vehicle occupants and estimated occupant injury.

Figure 4A:
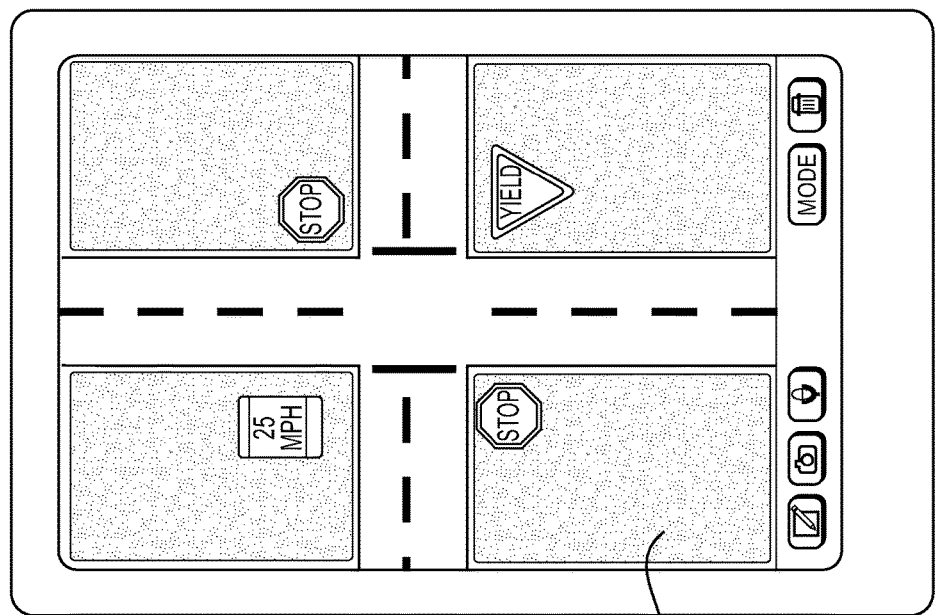
FIG. 4A is an illustration of an exemplary mobile computing device having the system, according to certain exemplary embodiments, installed and operating thereon.
Figure 4B:
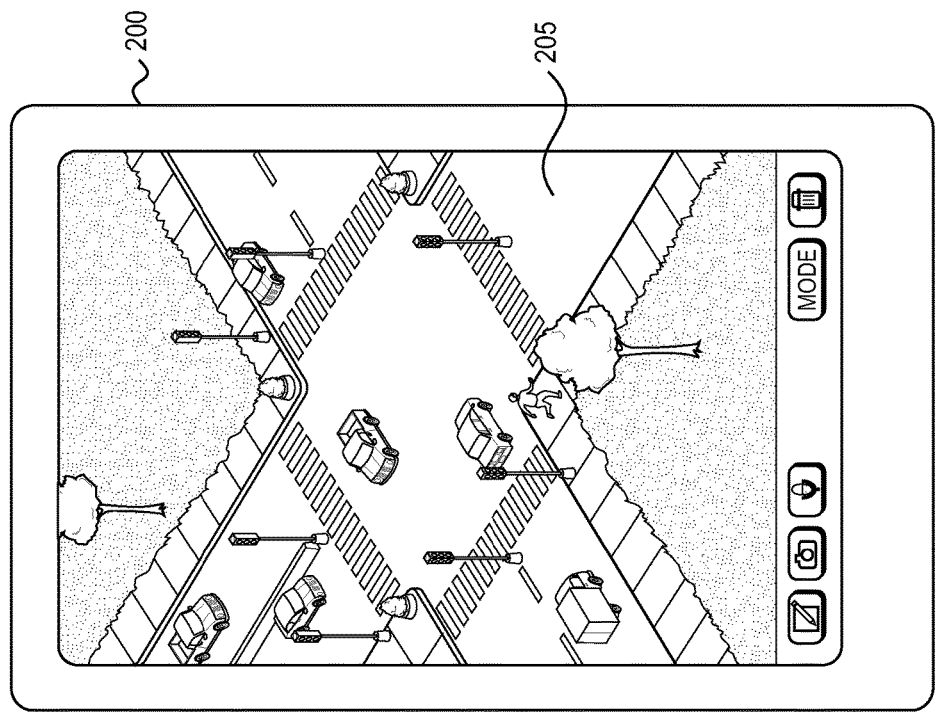
FIG. 4B is an illustration of an exemplary mobile computing device having the system, according to certain exemplary embodiments, installed and operating thereon.

The exemplary claim processing server 135 can also identify and request data ancillary to the insurance claim. For example, the claim processing server 135 can request time information from the user device 110 to determine an estimate of the local time of the insurance claim event and/or initiation of the insurance claim. In an exemplary embodiment, using GPS capabilities of the user device 110, the claim processing server 135 can request GPS location information to identify the location of the user device and likewise determine the location of the insurance claim event. In an exemplary embodiment, with respect to generating a model of the scene, once the location of the insurance claim event is identified, e.g., using GPS coordinates, the claim processing server 135 can identify (2D and 3D) map data associated with these coordinates. The map data may be stored on the data storage unit 130 and 140 or it may be available via the network 120. Using this location information and map data, the exemplary claim processing server 135 can generate a map and/or model of the scene of the insurance claim and display this model to the user 105, as illustrated in FIGS. 4A and 4B. The claim processing server 135 can also use the location information to supplement the model of the scene generated using the user image data. In an exemplary embodiment, using the location and time information, the exemplary claim processing server 135 can identify weather information corresponding to the location and time of the insurance claim event. In an exemplary embodiment, the claim processing server 135 can also use the location information, time information, and/or call history information of the user device 110 to determine if emergency services have been requested proximate the time and/or location of the insurance claim event.

The exemplary insurer server 115 enables storage of user data associated with the insurance claim. The insurer server 115 includes a data storage unit 140 accessible by the claim processing server 135. The exemplary data storage unit 140 can include one or more tangible computer-readable storage devices. The insurer server 115 can also includes a hard disk drive for reading from and writing to a hard disk (not shown), a magnetic disk drive for reading from or writing to a removable magnetic disk such as a floppy disk, and an optical disk drive for reading from or writing to a removable optical disk such as a CD-ROM, compact disk-read/write (CD/RW), DVD, or other optical media. Although an exemplary computer system can employs a ROM, a RAM, a hard disk drive, a removable magnetic disk, and a removable optical disk, other types of computer-readable media can also be used in the exemplary insurer server 115. The drives and their associated computer-readable media can provide nonvolatile storage of computer-executable instructions, data structures, program modules, and other data for the insurer server 115. A number of modules can be stored on the ROM, RAM, hard disk drive, magnetic disk, or optical disk, including operating instructions for the claim processing server 135.

It is contemplated that the user device 110 may also include one or more similar computer system components described with respect to the insurer server 115. Those having ordinary skill in the art having the benefit of the present disclosure will appreciate that the insurer server 115 and the user device 110 can have any of several other suitable computer system configurations.

In addition or in the alternative, data may be synchronized with a remote storage location, such as a cloud computing environment (not shown). In such an embodiment, the user 105 can access the information stored at the remote location using the user device 110 or another device, such as a desktop computer connected via the network 120. The insurer server 115 can access the computing environment via the network 120. The cloud computing environment can include an insurance claim account for each policyholder, including the user 105. The insurance claim account can store user data uploaded by the user 105, information obtained and/or created by the claim processing application 125 and the claim processing server 135, such as, for example, the object model. The cloud computing environment can synchronize this information with the claim processing application 125 and the claim processing server 135 periodically, on command, or in response to an update in information at the claim processing application 125 or the claim processing server 135. The components of the exemplary operating environment 100 have been described with reference to the exemplary systems illustrated in FIGS. 1-4, the exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more acts described may be performed by hardware, software, or a combination thereof, as may be embodied in one or more computing systems.

Figure 5:
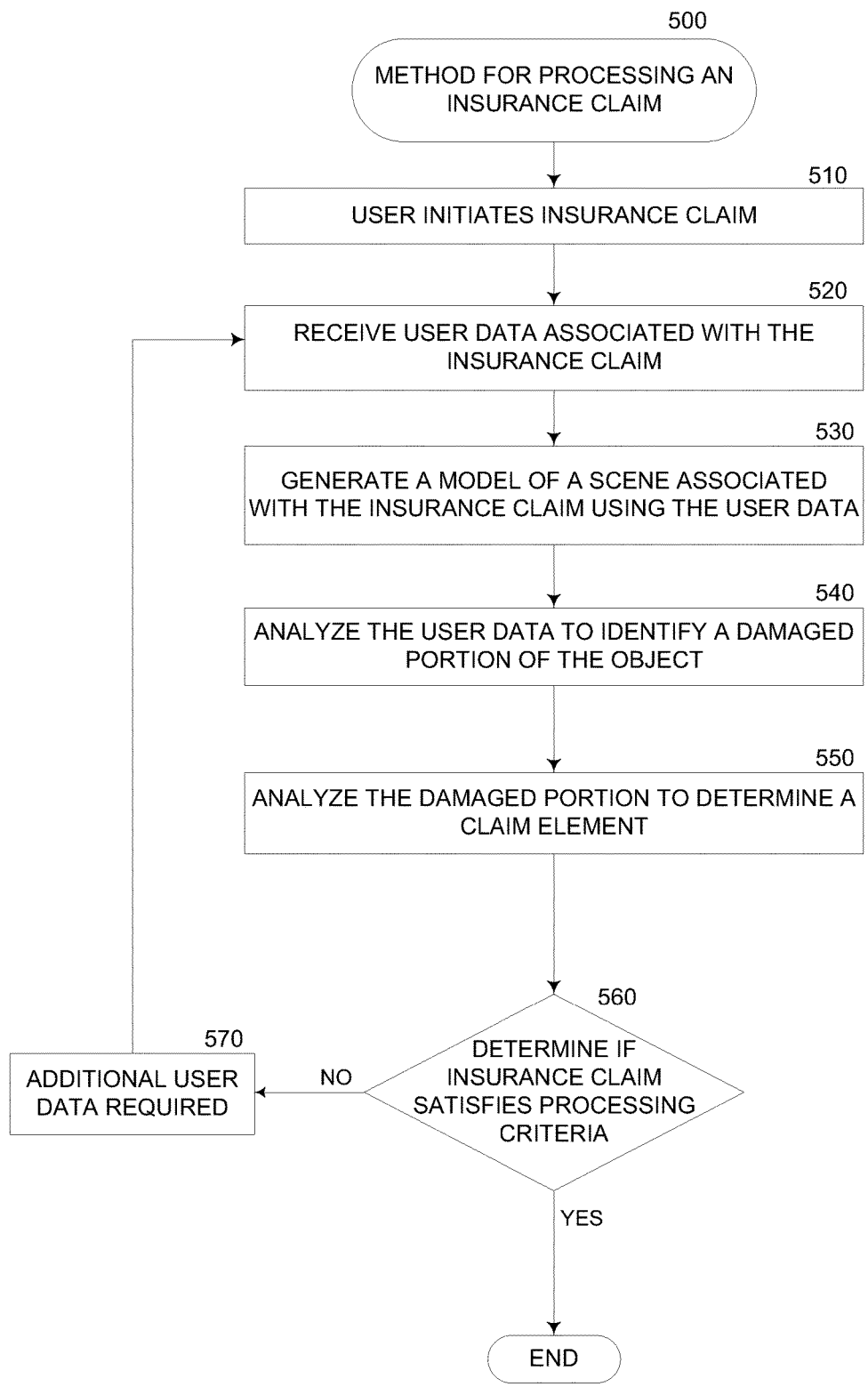
FIG. 5 is a flow chart depicting a method for processing an insurance claim in accordance with certain exemplary embodiments.

FIG. 5 is a flow chart depicting a method 500 for processing an insurance claim using the claim processing application 125 and claim processing server 135, in accordance with certain exemplary embodiments. A user 105 can initiate the insurance claim. (Step 510). In an exemplary embodiment, the user 105 can initiate the insurance claim at the user device 110 by activating the claim processing application 125. In an alternate embodiment, the insurance provider can push a message to the claim processing application 125 to initiate a claim at the user device 110.

The user 105 can provide data associated with the insurance claim. (Step 520). In an exemplary embodiment, the user 105 provides data to the claim processing server 135 using the claim processing application 125. The user data can be in the form of text, audio, or image data. In an exemplary embodiment, text can be captured by a keypad integral or otherwise coupled to the user device 110. In an exemplary embodiment, audio data can be captured by a microphone integral or otherwise coupled to the user device 110. In an exemplary embodiment, image data can be captured by a camera integral or otherwise coupled to the user device 110. In an exemplary embodiment, user 105 can upload user data to the claim processing server 135 using the claim processing application 125. The user data can be stored locally on the data storage unit 130 integral to the user device 110, on the data storage unit 140 accessible by the claim processing server 135, and/or in a cloud computing environment.

A model of the scene of the insurance claim event is generated using the user data. (Step 530). In an exemplary embodiment, the claim processing server 135 and/or the claim processing application 125 can generate dynamic 2D and/or 3D model(s) of the scene using the user data. For example, in the case of an automobile accident, the model of the scene would include a rendering of the scene of the accident, e.g., cars involved, intersection, etc. The model of the scene also includes a model of the object of the insurance claim, e.g., the user's 105 vehicle. For example, when the insurance claim involves an automobile accident, the scene includes a rendering of the scene of the accident and the user's 105 vehicle.

The claim processing server 135 can include instructions for combining the user image data to generate the model. In an embodiment including a video camera, frames of the captured video image can be sampled to identify frames of the video including images of the object/scene. The sampled frames can be combined to create the 3D rendering of the object/scene. In an exemplary embodiment, the claim processing server 135, can use stored data regarding the scene/object to generate object/model scene. For example, In an exemplary embodiment, the data storage unit 140 can store reference model data, including reference models, regarding the make/model of vehicles insured by the insurance provider. Using the stored vehicle data, the claim processing server 135 can supplement incomplete or poor quality image data received from the user 105 and use the reference model data when generating the model of the user's car. In an exemplary embodiment, the user device 110 may not provide image data sufficient to produce the model of the vehicle. The claim processing server 135 can utilize the stored reference model data as a standard model for the user device 110.

User data is analyzed to identify a damaged portion of the object. (Step 540). In an exemplary embodiment, the claim processing server 135 can analyze the user data and the generated models to identify damaged portions of the object. Damaged portions can be identified using feature extraction methods as described herein and as known in the art. The extracted features may include, for example, color, texture, brightness, contrast, edge detection, corner detection, text, coordinates relative to the coordinate system of the image, coordinates relative to a coordinates other than that of the image (e.g., global positioning coordinates), depth/surface mapping, and metadata embedded into the image file, or any other feature relevant to identifying content illustrated in the image. In an exemplary embodiment, by comparing the differences between the extracted features and reference feature data for the same or similar object, the claim processing server 135 identifies areas of inconsistency as those areas indicating damage to the object. Likewise, areas having irregular extracted feature data can also be identified as areas indicating damage to the object. In an exemplary embodiment, damaged portions of the object can be highlighted or otherwise tagged automatically in the model. By highlighting these portions of the model the user 105, insurance provider, and/or repair facility can easily focus attention and resources to the relevant portions of the object.

The damaged portion(s) of the object are analyzed to identify a claim element. (Step 550). Claim elements can include, for example, the identity of damaged components, the identity of potentially damaged components (i.e., hidden damage), the force of impact on the object, the force of impact on the occupants, and possible occupant injury. In an exemplary embodiment, the claim processing server 135 can utilize the image data and/or the extracted feature data to determine the identity of damaged and non-damaged components. The data storage unit 140 can store image and feature data regarding the make/model of vehicles insured by the insurance provider. By comparing the image data and/or extracted feature data of the object to stored data, the claim processing server 135 can identify objects having the same or similar image/feature data. Likewise, in an exemplary embodiment, the claim processing server 135 can use the imaged data and/or extracted feature data to identify possible hidden damage to the object. Using information regarding the identity of damaged components, the claim processing server 135 can search stored data for those components identified as related to or otherwise proximate in physical location to the damaged component. The vehicle information stored at the data storage unit 140 can also include make/model-specific component lists, component price lists, component order information, standard repair time tables and local repair pricing information, and any other data relevant to the identification, repair, and/or replacement of a vehicle component. Once the identity of the damaged components, including the identity of potentially hidden damaged components, the vehicle information can be used to determine the repair and replacement costs of the damaged components.

In an exemplary embodiment, claim processing server 135 can analyze the image data and the extracted feature data to determine the force of impact on the object. The force of impact can be determined quantitatively (e.g., newtons of force) and/or qualitatively (e.g., minor, moderate, severe). In an exemplary embodiment, the force of impact on the object can be used to correlate the force of impact on the occupant of the object and identify any potential occupant injuries. In determining the force of impact and occupant impact, the claim processing server 135 can take into account any safety equipment included in/on the object. For example, vehicle information stored in the data storage unit 140 can include information regarding whether the vehicle includes safety belts and/or harnesses, child seat, booster seat, the location and type of air bags, crumple zones, anti-lock breaks, occupant helmets etc. Using this information, the claim processing server 135 can provide an indication as to the severity of potential occupant injury if various safety equipment was utilized by the occupants. For example, the force on the occupants may be rated at "severe," however, the claim processing server 135 can determine that if the occupants were wearing seatbelts and the airbags were deployed, the rating of the force on the occupants may be listed as "moderate." The claim processing server 135 can permit the user 105 to indicate what safety features were used and the impact rating will be adjusted according. In an exemplary embodiment, using the force of impact on the occupant information and the information regarding the damage to the vehicle (e.g., force and location), the claim processing server 135 can identify possible occupant injury. The information regarding possible occupant injury can be used by the claim processing server 135 to validate medical claims submitted in association with the insurance claim. Medical claims submitted that do correlate with the identified potential occupant injury may be initially declined until further information is provided by the user 105.

Whether the insurance claim satisfies processing criteria can be determined based on the user data, the model, and/or a claim element. (Step 560). The processing criteria can identify the minimum amount of data and/or certain data points that are required for the claim to the processed. The processing criteria can be set by the insurance provider or the repair facility. In an exemplary embodiment, the claim processing server 135 can analyze the user data, the model, and/or a claim element to determine if sufficient data has been received to satisfy the processing criteria. For example, with respect to user data, the processing criteria may require, at a minimum, the following information: identity of the object, location and time of the claim, identity of any other parties associated with the claim, medical status of the user 105 and all other parties, and a police report number. In an exemplary embodiment, the processing criteria may require the claim processing server 135 to analyze the object or scene model to determine if sufficient model data has been collected. For example, the claim processing server 135 can require the user indicate on the model at least one damaged portion of the object. In an exemplary embodiment, the processing criteria may require the claim processing server 135 to determine at least one claim element. For example, the claim processing server 135 can require at least one damaged component be identified before processing and finalizing the insurance claim.

If the processing criteria is not satisfied, additional user data can be required. (Step 570). In an exemplary embodiment, having determined that the claim processing criteria has not been satisfied, the claim processing server 135 may query the user 105 to provide additional user data regarding the claim. For example, the claim processing server 135 may require the user provide additional information to replace or supplement that already provided. This supplemental user data can include text, audio, or image data. Using the supplemental user data, the claim processing server 135 can generate a new model of the scene/object. Using the new model, the claim processing server 135 can generate new claim elements. For example, the claim processing server 135 may require the user 105 to provide additional image data with respect to the object (e.g., a vehicle). Once the user provides the additional image data, a new model of the user's 105 vehicle can be generated. Using this new model and the supplemental image data, the claim processing server 135 can determine new claim elements. For example, using the supplemental image data and new model, the claim processing server 135 can identify additional/alternate damaged component as well as potentially damaged components. Using the supplemental image data and new model, the claim processing server 135 can recalculate the force of impact on the object, the force of impact on the occupants, and determine additional/alternate possible occupant injuries.

Figure 6:
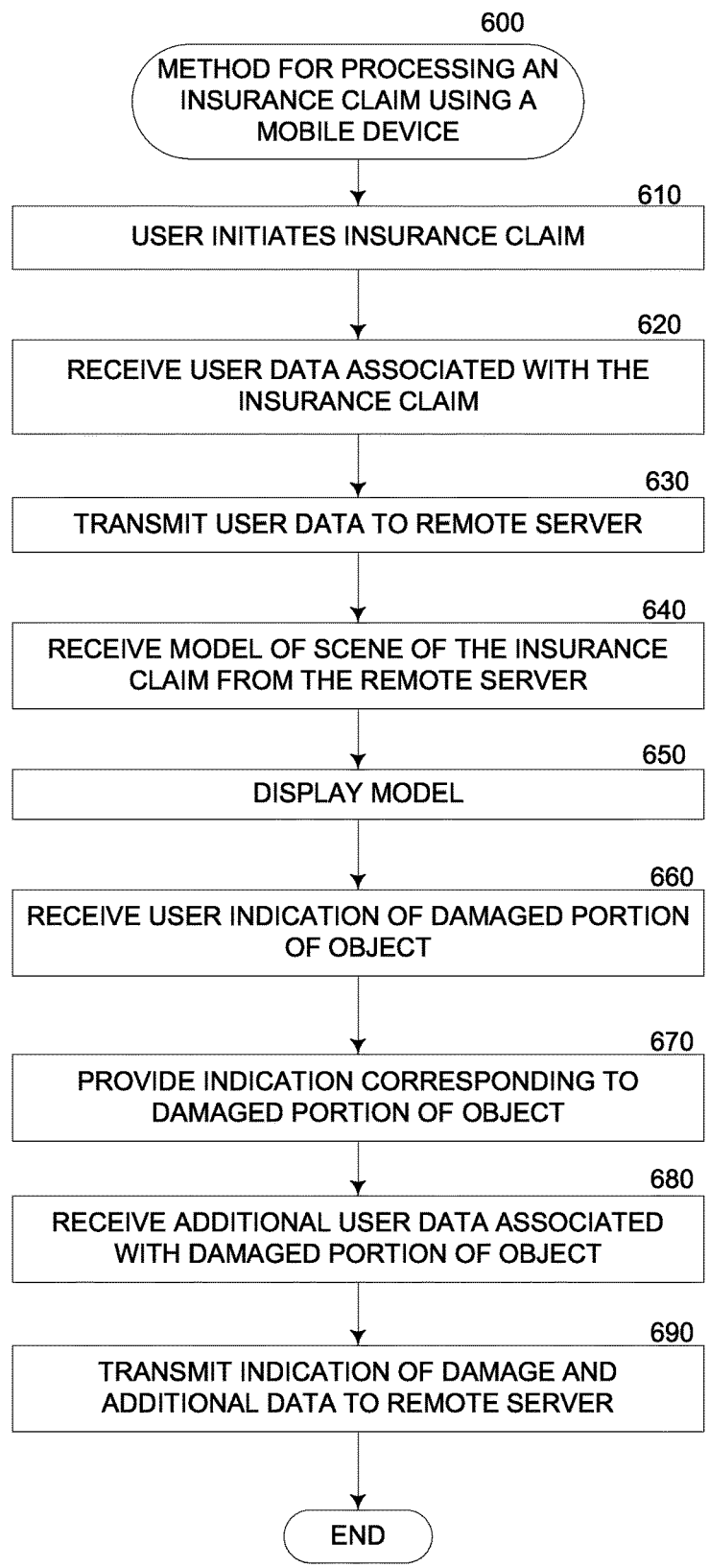
FIG. 6 is a flow chart depicting a method for processing an insurance claim in accordance with certain exemplary embodiments.

FIG. 6 is a flow chart depicting a method 600 for processing an insurance claim using an insurance claim processing application 125 resident on a mobile computing device. As method 600 is explained, reference will be made to FIGS. 2 through 4B and 6 concurrently. FIGS. 2 through 4B and 6 illustrate a mobile computing device operating in accordance with method 600.

Processing an insurance claim using an insurance claim processing application 125 resident on a mobile computing device requires a user 105 to initiate the insurance claim. (Step 610). The insurance claim can be initiated by the user 105 at the user device 110 through the claim processing application 125. As depicted in FIG. 2, an exemplary user device can include a mobile phone 200. In the exemplary embodiment, the claim processing application 125 is installed as a software application on the mobile phone 200. Using the display/interface provided on the user device 110, e.g., touch screen 205, the user 105 can activate the claim processing application 125 by selecting a corresponding icon located on the display. In an alternate embodiment, the insurance provider can push a message to the claim processing application 125 to initiate a claim on the mobile phone 200. In an alternate embodiment, the user 105 accesses the claim possessing application 125 using a web browser available on the mobile phone 200.

Using the mobile device, user data associated with the insurance claim is received at the user device. (Step 720). In an exemplary embodiment, the mobile phone 200 can be configured to receive text, image, and/or voice data from the user 105. As illustrated in FIG. 2, the mobile phone 200 can include a touch screen display 205 for providing text, image, and voice data to the claim processing application 125. For example, the touch screen display 205 can include a text icon 210, an image icon 215, an audio icon 220, a mode icon 225, and a trash icon 230.

Using the text icon 210, the user 105 can activate text features of the claim processing application 125. Text information provided by the user 105 can include, for example, accident and/or damage-related information, driver identification information, witness (e.g., contact information, witness statements, etc.), other party information (e.g., contact information, license and insurance information, etc.) In an exemplary embodiment, when the user 105 selects the text icon 210 on the mobile phone 200, the mobile phone 200 is configured to provide keypad functionality on the touch screen display 205. The claim processing application 125 can also enable two-way text-based communication, i.e., chatting, with a representative of the insurance provider and/or a repair technician.

Using the image icon 215, the user 105 can activate image capturing features of the claim processing application 125. Image information provided by the user 105 can include still and video images of the object and scene of the insurance claim. In an exemplary embodiment, the mobile phone 200 can include an integral camera (not shown). When the user 105 selects the image icon 215 on the touch screen display 205, the claim processing application 125 activates the mobile phone 200 camera to capture still and/or video images. Image-based information provided by the user 105 can include still and video images of the object and scene of the insurance claim. The image data can be used by the claim processing server 135 to generate a model of the object and/or scene of the insurance claim. The claim processing application 125 can also enable two-way video-based chat with a representative of the insurance provider and/or a repair technician. Video-based statements by the user 105, the other party to the claim, and witnesses are also contemplated.

Using the audio icon 220, the user 105 can activate audio capturing features of the claim processing application 125. Audio information provided by the user 105 can include audio statements regarding the accident and/or damage-related information, driver identification information, witness information (including recorded witness statements), and other party information. In an exemplary embodiment, the mobile phone 200 can include a microphone and related recording features (not shown). When the user 105 selects the audio icon 220, the claim processing application 125 activates the microphone and related recording features to capture and audio track. The claim processing application 125 can also enable two-way voice-based communication with a representative of the insurance provider and/or a repair technician.

Using the mode icon 225, the user 105 can activate various functions and display modes of the claim processing application 125. An exemplary display mode provides the ability to pan, zoom, and rotate the image of the object and/or scene on the touch screen display 205. The display can be changed by the user 105 using the touch screen display 205, user 105 voice commands, and/or corresponding movement/rotation of the mobile phone 200. In an exemplary embodiment, the display mode can simulate the user's 105 ability to move around the object and tag portions of the object model and scene model. In an exemplary embodiment, the display 205 provides images of the user's 105 vehicle captured by the mobile phone 200. As the user 105 moves around the vehicle, or simulates their movement around the vehicle, the user 105 can tag images of the vehicle captured by the mobile phone 200. In an exemplary embodiment, the user 105 can tag images of the vehicle as they are captured in real time.

Once collected, the user data is transmitted to a remove server. (Step 630). In an exemplary embodiment, the mobile phone 200 is configured to save the text, image, audio data to the data storage unit 130 resident on the mobile phone 200. Using the claim processing application 125, the stored text, image, audio data is transferred to the insurer server 115 (via network 120) where it can be stored to the data storage unit 140. In an alternate embodiment, the claim processing application 125 is configured to store the collected text, image, and audio data directly to the data storage until 140 at the insurer server 115 without accessing the claim processing server 135. For example, where the user 105 is accessing the claim processing application 125 using a web browser, data entered by the user 105 can be stored directly to the data storage until 140 at the insurer server 115.

A model of a scene corresponding to the insurance claim event is received from the remote server. (Step 640). In an exemplary embodiment, the insurer server 115 analyzes the user data and stored, when necessary, to generate a model of the scene of the insurance claim. The scene of the insurance claim can include a 2D and/or 3D rendering of location of the insurance claim. In an exemplary embodiment, the model of the scene of the insurance claim also include a model of the object, e.g., the user's 105 vehicle.

Figure 3B:
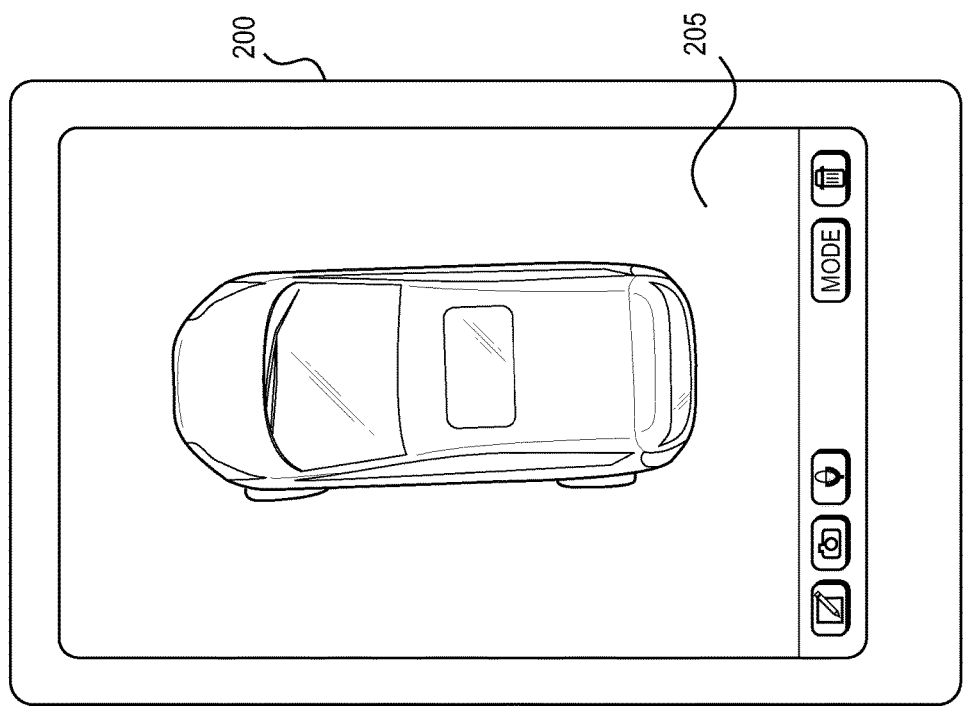
FIG. 3B is an illustration of an exemplary mobile computing device having the system, according to certain exemplary embodiments, installed and operating thereon.
Figure 3A:
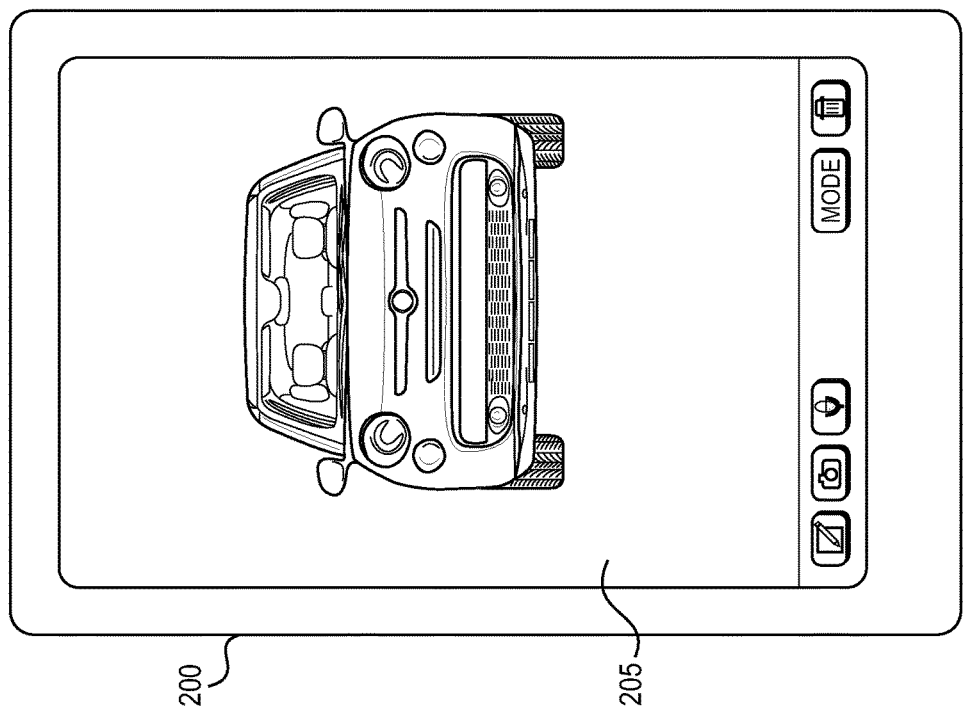
FIG. 3A is an illustration of an exemplary mobile computing device having the system, according to certain exemplary embodiments, installed and operating thereon.

The model is then displayed on the user device. (Step 650). In an exemplary embodiment, as illustrated in FIG. 2, the mobile phone 200 is configured to display the model of the user's 105 vehicle at the touch screen display 205. In an exemplary embodiment, the model of the user's 105 vehicle is a 3D rendering. Accordingly, various viewing angles can be provided. For example, as illustrated in FIG. 2, a model of the user's 105 vehicle can be displayed as a 3D rendering, or isometric view, of the vehicle. As illustrated in FIG. 3A, a front view of the vehicle can be displayed. As illustrated in FIG. 3B, a top view of the vehicle can be displayed. It is contemplated any viewing angle of the vehicle can be provided based on user 105 selection.

In an exemplary embodiment, as illustrated in FIGS. 4A and 4B, the mobile phone 200 is configured to display a model of the scene of the insurance claim at the touch screen display 205. In an exemplary embodiment, the model of the scene of the insurance claim is a 3D rendering. Accordingly, various viewing angles can be provided. For example, as illustrated in FIG. 4A, the scene of the insurance claim can be displayed as a 3D rendering, or isometric view, of the scene of the insurance claim. As illustrated in FIG. 4B, a top view of the scene of the insurance claim can be displayed. It is contemplated an any viewing angle of the vehicle can be provided based on user 105 selection.

In an exemplary embodiment, the user 105 can manipulate the object and scene models. For example, using the user interface provided at the touch screen display 205, the user 105 can manipulate the model, e.g., zoom, pan, rotate, etc. In an exemplary embodiment, the user 105 can zoom, pan, and/or rotate the model using voice commands. In an exemplary embodiment, the user 105 can zoom, pan, and/or rotate the model by moving/rotating the mobile phone 200 using, for example, the gyroscopic effect of the mobile phone 200 movement.

User input is received indicating portions of the model corresponding to object damage. (Step 660). In an exemplary embodiment, the user 105 can provide an indication to the claim processing server 125 identifying (i.e., tagging) portions of the object model and the scene model. For example, using the touch screen display 205 the user 105 can select a portion of the model to tag. The portion selected by the user 105 can include entire vehicle components or it can be limited to a single point on the model. In an exemplary embodiment, when the user 105 tags a portion of the vehicle model a visual indication of the tag is represented on the model (not shown). Once the model has been tagged, the user 105 can enter text, image, and/or audio data associated with that tag. It is contemplated that the user 105 can enter multiple forms of data associated with each tag. The data entered by the user 105 is linked to the tag and used by the claim processing server 135 to process the claim. In an exemplary embodiment, depending on the mode of the display, the user 105 can display various tags on the model. The various versions of tag-based model display include, for example, all tags, no tags, all tags corresponding to a particular component or region on the model, all tags including a particular data type (e.g., all tags including text data), or any other tag configuration preferred by the user 105.

An indication is provided corresponding to the damaged portion of the object. (Step 670). In an exemplary embodiment, the claim processing server 135 uses the image data to identify damaged portions of the object. The claim processing server 135 can provide an indication on the model corresponding to portions where the claim processing server 135 has determined there is actual or potential damage to the object. The indication can include, for example, a tag similar to those provided by the user 105 when tagging damaged portions of the model, shading, outlining, or otherwise changing the appearance of the damaged components on the model. For example, if the claim processing server 135 has determined that there is damage to the driver-side front fender of the user's vehicle 105, the claim processing server 135 can provide an indication on the model, visible on the touch screen display 205, identifying the damaged fender.

Additional user data associated with the damaged portion is received. (Step 680). In an exemplary embodiment, claim processing server 135 can tag those portions of the model identified as damage and request the user 105 provide additional and/or replacement data with respect to the tagged portion. For example, where the claim processing server 135 has tagged as damaged the driver-side front fender of the user's 105 vehicle, the claim processing server 135, via the claim processing application 125, can prompt the user 105 to enter additional data (text, audio, and/or image) regarding the tag. The additional data can include, for example, images of the fender from different angles than those originally provided, the user's 105 comments regarding the damage, video data of the user 105 demonstrating the functionality of the damaged component, etc. In an exemplary embodiment, the claim processing server 135 can tag those portions of the model where insufficient/incomplete data has been received. For example, if the image of the front fender panel is blurred, the claim processing server 135 can tag the panel and request the user 105 provide additional/replacement image data of the fender. In an exemplary embodiment, the user 105, using the mobile phone 200, inputs additional data (text, audio, and/or image) in response to the claim processing server 135 generated tags.

The indication of damage and the additional data are transmitted to the remote server. (Step 690). In an exemplary embodiment, the user 105 tags and the additional data created by the user 105 is response to the claim processing server 135 tags are transmitted to the insurer server 115 and the claim processing server 135. The user-generated tags and additional data, along with the claim processing server 135 generated tags, are used by the claim processing server 135 to processing the insurance claim. The tagged models and the associated tag data can be stored by the claim processing server 135 at the data storage device 140.

Figure 7:
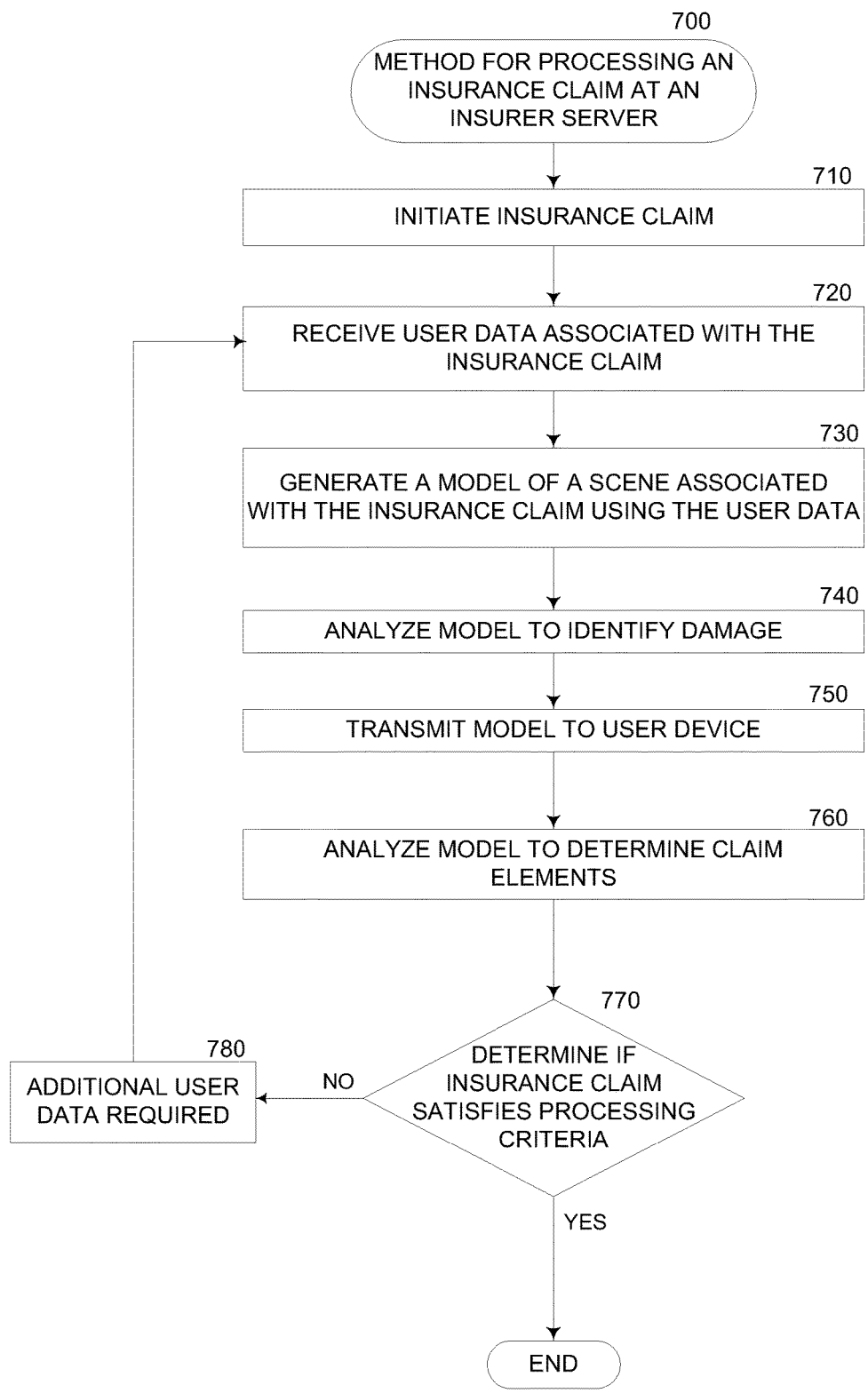
FIG. 7 is a flow chart depicting a method for processing an insurance claim in accordance with certain exemplary embodiments.

FIG. 7 is a flow chart depicting a method 700 for processing an insurance claim using an insurance claim processing server 135 coupled to a insurer server 115. Processing the insurance claim requires the insurance claim be initiated. (Step 710). In an exemplary embodiment, the user 105 can initiate the insurance claim at the user device 110 using the claim processing application 125. In an alternate embodiment, the insurance provider can initiate the insurance claim. For example, the insurance provider may receive a request or notice of the need to initiate an insurance claim from a source other than the claim processing application 125. For example, the insurance provider may receive notice of an accident and/or vehicle damage from public records, such as police records, or private records such as those generated by a repair facility. In an exemplary embodiment, the insurance provider may receive notice of actual or possible damage based on news and weather information identifying a weather event such as hail, flood, and earthquake. Additionally, the insurance provider may receive notice of actual or possible damage based on images received from satellite, aircraft, and/or drone aerial vehicles. The insurance provider can initiate the insurance claim using the claim processing server 135. The claim processing server 135 can push a request to the claim processing application 125 resident on the user device 110. The request can activate the claim processing application 125 and prompt the user 105 to provide information regarding the claim.

User data associated with an insurance claim is received. (Step 720). In response to the request for data associated with the insurance claim, the user 105 can provide data via the claim processing application 125 to the claim processing server 135. The user data can include text, audio, and/or image data associated with the insurance claim event. The received user data can be stored at the insurer server 115 on the data storage unit 140. Data resident on the data storage unit 140 can be accessed and modified by the claim processing server 135.

The received user data is then analyzed by the claim processing server 135 to generate a model of a scene associated with the insurance claim incident. (Step 730). The model of the scene also includes a model of the object of the insurance claim, e.g., the user's 105 vehicle. The model can include a dynamic two-dimensional and/or three-dimensional rendering of the scene of the accident and the object. In an exemplary embodiment, the claim processing server 135 generates a single model including both the scene of the insurance claim, the object, and any other party's object relevant to the claim. In an alternate embodiment, the claim processing server 135 generates separate models for each of the scene, the object, and any other party's objects relevant to the insurance claim. For example, the claim processing server 135 can generate a model including the user's 105 vehicle, the scene of the accident, and the other party's vehicle. An addition, or in the alternative, the claim processing server 135 can generate separate models for each of the user's 105 vehicle, the scene of the accident, and the other party's vehicle. The claim processing server 135 may determine that multiple models are needed when the object and the relevant portions of the scene are located far apart and image data does not provide sufficient detail. For example, if the user 105 hits a fence while driving, the image data captured by the user 105 may show that the user's vehicle and the damaged fence are too far apart and quality images cannot be obtained. In such an embodiment, the claim processing server 135 may require the user 105 provide, separately, image data associated with the user's 105 vehicle and image data associated with the damaged fence. In an alternate example where the user 105 is involved in an auto accident with another vehicle, image data provided by the user 105 including both the user's 105 vehicle and the other vehicle may provide enough detail that a single model, including both cars, can be created. The number of models generated can also be determined based on user 105 preference and/or insurance provider preference. The generated models can be stored at the insurer server 115 on the data storage unit 140. The models resident on the data storage unit 140 can be accessed and modified by the claim processing server 135.

The model is analyzed to identify damaged portions of the object. (Step 740). In an exemplary embodiment, the claim processing server 135 can analyze the generated models to identify damaged portions of the object. Damaged portions can be identified using feature extraction methods as described herein and as known in the art. The model is transmitted to the user device 110. (Step 7850). In an exemplary embodiment, the model is transmitted via network 120 to the user device 110. As user data is updated, new (replacement) models can be generated. The new models can be transmitted to the user device 110 for display and manipulation by the user 105.

Damaged portions of the model are analyzed to determine various claim elements. (Step 760). Claim elements can include, for example, the identity of damaged components, the identity of potentially damaged components (i.e., hidden damage), the force of impact on the object, the force of impact on the occupants, and possible occupant injury. Claim element data can be stored at the insurer server 115 on the data storage unit 140. As user data is updated, claim elements can recalculated and additional/alternate claim elements can be identified.

The user data, model, and claim element are analyzed to determine if the insurance claim satisfies processing criteria. (Step 770). The processing criteria can identify the minimum amount of data and/or certain data points that are required for the claim to the processed. If the processing criteria are not met, additional user data can be required. (Step 780). In an exemplary embodiment, the claim processing server 135 can query the user 105, via the claim processing application 125, to provide specific data necessary for processing the insurance claim. The claim processing server 135 may query the user 105 until the processing criteria are satisfied. Once the processing criteria are satisfied, the insurance claim can be finalize and processed. In an exemplary embodiment, a finalized processed insurance claim can result in approved repair, approved/validated medical injury claims, issuing of settlement amounts if the vehicle is considered a complete loss, billing the user 105 for deductible amounts, and any other result known to those in the art when finalizing an insurance claim. In an alternate embodiment, the claim processing server 135 can submit a completed insurance claim application to an insurance provider. In lieu of processing the insurance claim, the claim processing server can provide the user data and all other data created by the claim processing server 135 in a complete insurance claim application. The insurance claim application can be submitted to an insurance provider for approval and final processing. In an alternate embodiment, the claim processing server 135 can issue an initial assessment of the claim rather than finalize the claim. The initial assessment can provide the user 105 with an intermediate level of resolution of their insurance claim while other, perhaps long-term, factors are worked out between the user 105 and the insurance provider. The initial assessment can include, for example, estimated repair costs and approval of repair. The initial assessment can limit repair to certain dollar amounts or to specific repair tasks. The initial assessment speeds up the claim process and allows the user 105 to proceed to resolution with certain elements of their insurance claim (e.g., repair) while other elements can continue to be negotiated (e.g., settlement for medical injury).

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A mobile computing device comprising:
   a handheld device including:
   a non-transitory computer readable media having stored thereon an processing application;
   a camera;
   an interface; and
   a processor, wherein said processor upon execution of the processing application, is configured to:
   receive first video images captured by the camera, including at least panned video images of a vehicle and physical scene of physical surroundings of the vehicle;
   display, via the interface, the captured first video images in real time;
   transmit the captured first video images to a remote server;
   receive from the remote server a request for second video images, including at least the panned video images of the vehicle and physical scene of physical surroundings of the vehicle, and a pacing feature including information indicating a rate for panning the camera while capturing the second video images by the camera;
   receive second video images captured by the camera;
   display, via the interface, the captured second video images and a dynamic image of the pacing feature in real time;
   transmit the captured second video images to the remote server;
   receive a model of the vehicle included in a model of the physical scene of the physical surroundings of the vehicle from the remote server, wherein the model of the vehicle and the model of the physical scene are based on the transmitted second video images captured by the camera and wherein the model of the vehicle and the model of the physical scene are generated by the remote server from the second video images;
   automatically identify an auto-indicated damaged portion of the vehicle in the model of the vehicle, comprising:
      (i) extracting one or more features from the model of the vehicle, wherein the extracted one or more features are selected from color, texture, brightness, contrast, edge detection, corner detection, text, coordinates relative to coordinate system of the model of the vehicle, coordinates relative to a coordinate other than that of the model of the vehicle, depth/surface mapping,
      (ii) analyzing the one or more extracted features and identifying portions of the vehicle in the model of the vehicle where the one or more extracted features are irregular or not in alignment with reference object data;
   display on the handheld device the model of the vehicle included in the model of the physical scene of the physical surroundings of the vehicle;
   receive a user input indicating a user-indicated damaged portion of the vehicle in the model of the vehicle;
   display on the handheld device both the auto-indicated damaged portion of the vehicle in the model of the vehicle and the user-indicated damaged portion of the vehicle in the model of the vehicle;
   receive data associated with either the auto-indicated damaged portion or the user-indicated damaged portion of the model of the vehicle; and
   transmit either the auto-indicated damaged portion of the vehicle in the model of the vehicle and the data associated with the auto-indicated damaged portion of the vehicle or the user-indicated damaged portion of the vehicle and the data associated with the user-indicated damaged portion of the vehicle.

2. The mobile computing device of claim 1, wherein:
   the associated data comprises at least one of a force of impact on the vehicle, a force of impact on an occupant of the vehicle, an identity of a damaged vehicle component, and an identity of a candidate damaged component of the vehicle.

3. The mobile computing device of claim 1, wherein:
the associated data comprises at least one of a force of impact on the vehicle, a force of impact on an occupant of the vehicle, an identity of a damaged object component, and an identity of a candidate damaged component of the vehicle; and
said processor, upon execution of the processing application, is further configured to:
determine a cost of repair based on at least one of the identity of the damaged vehicle component and the identity of the candidate damaged vehicle component; and
provide an initial claim assessment when the cost of repair is less than a threshold repair cost.

4. The mobile computing device of claim 1, wherein
the associated data comprises at least one of a force of impact on the vehicle, a force of impact on an occupant of the vehicle, an identity of a damaged vehicle component, and an identity of a candidate damaged component of the vehicle; and
said processor, upon execution of the processing application, is further configured to:
analyze the force of impact on the occupant to identify a potential injury to the occupant; and
analyze the force of impact on the occupant to validate a medical claim of the occupant.

5. The mobile computing device of claim 1, wherein the associated data further includes at least one of text data, voice data, and video image data.

6. The mobile computing device of claim 1, wherein the model of the vehicle received from the remote server is a three dimensional model.

7. The mobile computing device of claim 1, wherein:
said processor, upon execution of the processing application, is further configured to:
retrieve vehicle information associated with the vehicle from a database;
retrieve scene information from the database, the scene information including a location of the vehicle;
generate the model of the physical scene of the physical surroundings of the vehicle by analyzing the scene information; and
generate a model of the vehicle by analyzing the vehicle information.

8. The mobile computing device of claim 1, wherein the associated data includes ancillary data, the ancillary data including at least one of accident location information, accident time information, accident weather information, and emergency services information.

9. The mobile computing device of claim 1, wherein said processor, upon execution of the processing application, is further configured to:
receive data associated with a second vehicle;
generate a model of the second vehicle using the data associated with the second vehicle data; and
analyze the data associated with the second vehicle to identify a damaged portion of the second vehicle.

10. The mobile computing device of claim 1, wherein:
said processor, upon execution of the processing application, is further configured to:
receive a user indication of a damaged portion of the vehicle; and
receive an indication of a damaged portion of the vehicle from a source other than the user.

11. The mobile computing device of claim 1, wherein said processor, upon execution of the insurance claim processing application is further configured to:
request additional user data if the indication and the associated data does not satisfy predefined processing criteria.

12. A mobile computing device comprising:
a handheld device including:
a non-transitory computer readable media having stored thereon an processing application;
a camera;
a touch screen display; and
a processor, wherein said processor upon execution of the processing application, is configured to:
receive first video images captured by the camera, including at least panned video images of a vehicle and physical scene of physical surroundings of the vehicle;
display, via the touch screen display, the captured first video images in real time;
transmit the captured first video images to a remote server;
receive from the remote server a request for second video images, including the at least panned video images of the vehicle and physical scene of physical surroundings of the vehicle, and a pacing feature including information indicating a rate for panning the camera while capturing the second video images by the camera;
receive second video images captured by the camera;
display, via the touch screen display, the captured second video images and a dynamic image of the pacing feature in real time;
transmit the captured second video images to the remote server;
receive a model of the vehicle included in a model of the physical scene surrounding the vehicle from the remote server, wherein the model of the vehicle and the model of the physical scene are based on the transmitted second video images captured by the camera, wherein the model of the vehicle and the model of the physical scene are generated by the remote server from the second video images;
automatically identify an auto-indicated damaged portion of the vehicle in the model of the vehicle, comprising:
(i) extracting one or more features from the model of the vehicle, wherein the extracted one or more features are selected from color, texture, brightness, contrast, edge detection, corner detection, text, coordinates relative to coordinate system of the model of the vehicle, coordinates relative to a coordinate other than that of the model of the vehicle, depth/surface mapping,
(ii) analyzing the one or more extracted features and identifying portions of the vehicle in the model of the vehicle where the one or more extracted features are irregular or not in alignment with reference object data;
display on the handheld device the model of the vehicle included in the model of the physical scene of the physical surroundings of the vehicle;
receive a user input via the touch screen display indicating a user-indicated damaged portion of the vehicle in the model of the vehicle corresponding to a damaged portion of the vehicle;
provide an indication corresponding to the user-indicated damaged portion of the vehicle;

display on the handheld device the indication corresponding to the user-indicated damaged portion of the vehicle;

receive data associated with the user-indicated damaged portion of the vehicle, the associated data comprising at least one of a force of impact on the vehicle, a force of impact on an occupant of the vehicle, an identity of a damaged vehicle component, and an identity of a candidate damaged component of the vehicle;

transmit the user-indicated portion of the vehicle and the data associated with the user-indicated damaged portion of the vehicle to the remote server;

receive an updated model of the vehicle from the remote server, wherein the updated model of the vehicle is based on the data associated with the user-indicated damaged portion of the vehicle;

display on the touch screen display both the auto-indicated damaged portion of the vehicle in the updated model of the vehicle and the user-indicated damaged portion of the vehicle in the updated model of the vehicle;

determine a cost of repair based on at least one of the identity of the damaged vehicle component and the identity of the candidate damaged vehicle component; and provide an initial assessment when the cost of repair is less than a threshold repair cost.

13. The mobile computing device of claim 12, wherein the associated data further includes at least one of text data, voice data, and video image data.

14. The mobile computing device of claim 12, wherein the model of the vehicle received from the remote server is a three dimensional model.

* * * * *